United States Patent [19]

König et al.

[11] 4,369,301

[45] Jan. 18, 1983

[54] LACQUER POLYISOCYANATES, PROCESS FOR THE PRODUCTION THEREOF AND USE THEREOF AS ISOCYANATE COMPONENT IN THERMOSETTING TWO-COMPONENT POLYURETHANE LACQUERS

[75] Inventors: Eberhard König, Kronberg; Josef Pedain, Cologne; Hans J. Kreuder, Krefeld, all of Fed. Rep. of Germany

[73] Assignee: Bayer Aktiengesellschaft, Leverkusen, Fed. Rep. of Germany

[21] Appl. No.: 312,030

[22] Filed: Oct. 16, 1981

[30] Foreign Application Priority Data

Oct. 22, 1980 [DE] Fed. Rep. of Germany ....... 3039824

[51] Int. Cl.$^3$ .............................................. C08G 18/80
[52] U.S. Cl. ....................................... 528/45; 427/27; 528/68; 528/61
[58] Field of Search ................................ 528/45, 902

[56] References Cited

U.S. PATENT DOCUMENTS

| | | | |
|---|---|---|---|
| 3,647,848 | 3/1972 | Wagner et al. | 260/453 AB |
| 4,055,550 | 10/1977 | Panandiker et al. | 260/77.5 AA |
| 4,101,473 | 7/1978 | Lander | 528/45 |
| 4,150,211 | 4/1979 | Mueller et al. | 528/45 |
| 4,151,152 | 4/1979 | Schmitt et al. | 260/33.6 UB |
| 4,177,342 | 12/1979 | Bock et al. | 528/45 |
| 4,212,962 | 7/1980 | Schmitt et al. | 528/45 |
| 4,246,380 | 1/1981 | Gras et al. | 525/440 |
| 4,252,923 | 2/1981 | König et al. | 525/452 |
| 4,310,646 | 1/1982 | Kempter et al. | 528/45 |

FOREIGN PATENT DOCUMENTS 253221 3/1967 Austria .

*Primary Examiner*—H. S. Cockeram
*Attorney, Agent, or Firm*—Gene Harsh; Lawrence S. Pope; Thomas W. Roy

[57] ABSTRACT

The present invention relates to lacquer polyisocyanates which contain about 0 to 8% free isocyanate groups, about 10 to 28% blocked isocyanate groups and about 2 to 10% of the structural units, —NH—NH—CO—O, all percentages based on the weight of the polyisocyanates, but excluding the weight of the blocking agent. Also provided is a process for preparing these polyisocyanates which comprises reacting about 10 to 30 mol % of the isocyanate groups of an organic polyisocyanate with reaction products which have (i) alcoholic hydroxyl groups and (ii) structural units of the formula, —O—CO—NH—NH—CO—O—, and/or of the formula $H_2N$—NH—CO—O—, with the formation of urethane groups and optionally groups corresponding to the formula, —NH—NH—CO—O—, and reacting about 50 to 90 mol % of the isocyanate groups of the organic polyisocyanate with a blocking agent. The reaction products containing alcoholic hydroxyl groups are obtained by reacting 1 mol of hydrazine or of hydrazine hydrate with about 1 to 2 mols of a cyclic carbonate. A final object of the present invention is the use of the new lacquer polyisocyanates as the isocyanate component in thermosetting, two-component polyurethane lacquers.

5 Claims, No Drawings

LACQUER POLYISOCYANATES, PROCESS FOR THE PRODUCTION THEREOF AND USE THEREOF AS ISOCYANATE COMPONENT IN THERMOSETTING TWO-COMPONENT POLYURETHANE LACQUERS

BACKGROUND OF THE INVENTION

1. Field of the Invention

This invention relates to new lacquer polyisocyanates which have at least partially blocked isocyanate groups and which allow the production of nonyellowing lacquers due to incorporated stabilizers, to a process for the production of the new lacquer polyisocyanates and to the use thereof as isocyanate component in thermosetting two-component polyurethane lacquers.

2. Description of the Prior Art

Irrespective of whether polyurethane stoving lacquers are processed as a solution or as a powder, they consist essentially of a hydroxyl component and a polyisocyanate component, the NCO groups of which are completely or partially blocked by a blocking agent to prevent them from reacting prematurely. This second possibility is described, for example, in U.S. Pat. No. 4,055,550 or in German Offenlegungsschrift No. 2,842,641. A cross-linking reaction forming the lacquer only occurs under the influence of heat (for example, heating a coated substrate to 180° C. for 30 minutes) with release of the blocking agent.

However, the known thermosetting two-component polyurethane lacquers exhibit a more or less marked tendency to yellow under the influence of the high temperatures which are necessary for stoving. This fact is particularly disadvantageous in continuous industrial lacquering when, for example, stoving is either carried out for too long or at too high a temperature due to technical disturbances.

In such a case, a nonuniform series of different colored parts are produced. The production of a nonyellowing, clear lacquer on, for example, a silvery background is also a problem because the disturbing effect is particularly conspicuous due to the lacking pigment.

Attempts have been made to overcome this disadvantage with the development of polyisocyanates which are particularly color-stable to heat. Such polyisocyanates described, for example, in published European Patent Application No. 798 and in German Offenlegungsschrift No. 2,842,641, are based on trimerized 1-isocyanato-3,3,5-trimethyl-5-isocyanatomethylcyclohexane (isophorone-diisocyanate or IPDI). A particular disadvantage of the lacquer polyisocyanates or lacquering processes described in the prior publications mentioned is the restriction to only one of the commercially, easily accessible polyisocyanates, quite apart from the fact that the yellowing resistance of the lacquers produced using this specific lacquer polyisocyanate, in particular, clear lacquers, is in need of improvement.

German Offenlegungsschrift No. 1,720,711 does indeed indicate a course of action as to how various polyisocyanates may be modified such that they allow for the production of lacquers having an increased yellowing resistance. However, the modified polyisocyanates which are recommended in this publication suffer from considerable disadvantages. Thus, the production of the stabilized polyisocyanates according to the publications mentioned is commercially expensive, because it is necessary to react the N,N-dialkylhydrazine compound used for stabilization with a large excess of low molecular weight polyisocyanate and then to remove the unreacted excess polyisocyanate by distillation. The use of N,N-dialkyl-substituted hydrazines as a stabilizer is also a problem. Lacquer films produced using such polyisocyanates always still contain basic N-atoms which in turn are readily open to an attack by atmospheric acids, thereby reducing the resistance of the lacquer, particularly in an industrial climate.

An object of the present invention is to provide new lacquer polyisocyanates which may be produced in an easily controllable reaction by modifying any polyisocyanates, which allow for the production of nonyellowing stoving lacquers. This object may be achieved by the process according to the present invention which is described in more detail in the following.

SUMMARY OF THE INVENTION

The present invention provides lacquer polyisocyanates, characterized by a content, based on the weight of the polyisocyanate, but excluding the weight of the blocking agent, of:

(a) free isocyanate groups of from about 0 to 8%, by weight, (b) isocyanate groups blocked by blocking agents of from about 10 to 28%, by weight; and (c) structural units corresponding to the following formula:

—NH—NH—CO—O of from about 2 to 10%, by weight.

Another object of the present invention is to provide a process for the production of these lacquer polyisocyanates, which is characterized in that:

(a) from about 10 to 30 mol % of the isocyanate groups of an organic polyisocyanate are reacted with reaction products which have (i) alcoholic hydroxyl groups and (ii) structural units corresponding to the following formula:

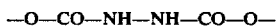
—O—CO—NH—NH—CO—O— and/or the following formula:

H₂N—NH—CO—O— said reaction products being obtained from the reaction of 1 mol of hydrazine or hydrazine hydrate and about 1 to 2 mols of a cyclic carbonate, the reaction (a) taking place with the formation of urethane groups and optionally groups corresponding to the following formula:

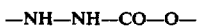
—NH—NH—CO—O— and (b) from about 50 to 90 mol % of the isocyanate groups of the starting isocyanate are blocked by blocking agents; the reaction according to (a) being carried out before, during or after the reaction (b).

A further object of the present invention is the use of the new lacquer polyisocyanates as the isocyanate component in thermosetting, two-component polyurethane lacquers.

DETAILED DESCRIPTION OF THE INVENTION

Starting materials for the process according to the present invention are:

(a) any organic polyisocyanates;

(b) reaction products of hydrazine with cyclic carbonates having structural units corresponding to the following formulae:

—O—CO—NH—NH—CO—O— and/or

H₂N—NH—CO—O—;

and (c) any blocking agents for organic polyisocyanates.

Examples of suitable polyisocyanates (a) are the following:

(i) any aliphatic, cycloaliphatic, araliphatic or aromatic polyisocyanates, in particular, diisocyanates having a molecular weight of from about 168 to 300, for example, 2,4- and/or 2,6-diisocyanatotoluene, 2,4'- and/or 4,4'-diisocyanato-diphenylmethane, the methyl-substituted derivatives of the last-mentioned diisocyanates, hexamethylene diisocyanate, isophorone diisocyanate, m- and p-xylylene diisocyanate, 4,4'-diisocyanato-dicyclohexylmethane, 1-methyl-2,4- and/or 1-methyl-2,6-diisocyanato-cyclohexane, and mixtures of these diisocyanates;

(ii) reaction products of the diisocyanates (i) with excess di- and/or trifunctional hydroxyl compounds having aliphatically bound hydroxyl groups and having a molecular weight of from about 62 to 400, for example, ethylene glycol, diethylene glycol, triethylene glycol, propylene glycol, dipropylene glycol, tripropylene glycol, tetrapropylene glycol, tetramethylene diol, hexamethylene diol, 4,4'-dihydroxy-dicyclohexylmethane, 1,4-bis-(2-hydroxyethoxy)-benzene, trimethylolpropane or trihydroxyethyl isocyanurate;

(iii) polyisocyanates having biuret groups, obtained in known manner by partial biuretization of the diisocyanates (a), in particular, hexamethylene diisocyanate;

(iv) polyisocyanates having uretdione groups as described, for example, in German Offenlegungsschrift No. 2,502,934; and (v) polyisocyanates having isocyanurate groups, obtainable, for example, by the known trimerization of the diisocyanates (i) and described, for example, in published European Patent Application No. 10589, or in German Offenlegungsschrift Nos. 2,707,656 or 2,806,731, in particular, isocyanurate group-containing polyisocyanates obtainable by the trimerization of hexamethylene diisocyanate, 2,4- and optionally 2,6-diisocyanato-toluene or isophorone diisocyanate, and so-called "mixed trimers" from mixtures of the diisocyanates (i).

The polyisocyanates (a) which are suitable for the purposes of the present invention, in particular, the starting polyisocyanates exemplified above, have an NCO content of from about 10 to 50%, by weight. Polyisocyanates (a) which are particularly suitable for the present process are polyisocyanates or polyisocyanate mixtures having an (average) NCO content of from about 10 to 50%, by weight, more particularly from about 14 to 35%, by weight, selected from hexamethylene diisocyanate, 1-isocyanato-3,3,5-trimethyl-5-isocyanatomethyl-cyclohexane, 4,4'-diisocyanato-dicyclohexylmethane, 2,4- and/or 2,6-diisocyanato-toluene, 2,4'- and/or 4,4'-diisocyanato-diphenyl-methane, urethane group-containing reaction products of these diisocyanates with underequivalent amounts of aliphatic diols or triols having a molecular weight of from about 62 to 400 and the trimers or mixed trimers of the diisocyanates mentioned having isocyanate and isocyanurate groups.

The starting materials (b) suitable for use in the present process are reaction products of hydrazine or hydrazine hydrate and certain cyclic carbonates having structural units corresponding to the following formulae:

—O—CO—NH—NH—CO—O— and/or

H₂N—NH—CO—O—

Hydrazine and preferably hydrazine hydrate are used for the production of these reaction products. Reactants for hydrazine or hydrazine hydrate in this case are any cyclic alkylene carbonates having 5- or 6-membered rings, for example, ethylene glycol and propylene glycol carbonate (2-oxo-4-methyl-1,3-dioxolane), 2-oxo-4-hydroxymethyl-1,3-dioxolane (reaction product of 1 mol of glycerin with 1 mol of diphenyl carbonate) and 1,3-dioxanone-(2)-ring compounds obtained, for example, by reacting 1,3-propane diol or neopentyl glycol with diphenyl carbonate. Ethylene glycol carbonate and propylene glycol carbonate are preferred.

For the production of the starting materials (b), hydrazine hydrate, optionally in a solvent such as toluene or isopropanol, is preferably introduced and reacted with the exemplified cyclic carbonates in a mol ratio of hydrazine:carbonate of from about 1:1 to 1:2 at from about 40° to 100° C. After water and optionally solvent have been distilled off, a colorless oil or a solid product remains which may be used as the starting material (b). According to a particularly preferred embodiment, the hydrazine adducts (b) are produced in the blocking agent also to be used in the present process, e.g., ε-caprolactam, as the solvent, which is naturally not distilled off subsequent to the production of the hydrazine adducts. Instead, such a solution of the adduct in the blocking agent may be used directly when carrying out the present process.

Hydrazine adducts (b) which are particularly preferred are the reaction products of hydrazine hydrate with ethylene glycol carbonate or propylene glycol carbonate in a mol ratio of hydrazine:carbonate of from about 1:1.1 to 1:1.7.

The hydrazine adducts (b) used according to the present invention are compounds or mixtures of compounds corresponding to the following general formulae:

H₂N—NH—CO—O—R—OH and/or

HO—R—O—CO—NH—NH—CO—O—R—OH wherein R represents the alkylene radical of the cyclic carbonate, which is optionally substituted by alkyl or hydroxyl, e.g., when using cyclic carbonates based on glycerin and diphenyl carbonate, and which is inert with respect to the production of the hydrazine adducts.

Blocking agents (c) which are suitable for the use according to the present invention are any known blocking agents for organic polyisocyanates, such as phenol, $C_1$-$C_{18}$ alkyl-substituted phenols, hydroxydiphenyl, butanone or cyclohexanone oxime, N-hydroxyhexahydro-phthalimide, tert.-butanol, malonic acid diethyl ester, acetoacetic acid ethyl ester, the various isomeric triazoles and particularly ε-caprolactam.

The process according to the present invention is carried out at a temperature of from about 50° to 200° C., in particular, from about 100° to 160° C. The reactants (a), (b) and (c) are used in the reaction in such quantities that the present lacquer polyisocyanates contain from about 0 to 8%, in particular, from about 0 to 4%, by weight, of free isocyanate groups; from about 10 to 28%, in particular, from about 12 to 26%, by weight, of blocked isocyanate groups (calculated as NCO, molecular weight=42); and from about 2 to 10%, preferably from about 3 to 8%, by weight, of structural units corresponding to the following formula:

—NH—NH—CO—O— the percentages relating to the lacquer polyisocyanate, but excluding the weight of the blocking agent. This means that, in general, from about 5 to 25 parts, in particular, from about 6 to 19 parts, by weight, of hydrazine adduct (b) and from about 30 to 80 parts, preferably from about 40 to 70 parts, by weight, of blocking agent (c) are used per 100 parts, by weight, of starting polyisocyanate (a), so that from about 0 to 20 mol %, preferably from about 0 to 15 mol %, of the isocyanate groups of the starting isocyanate (a) are present in the products in a free form, from about 50 to 90 mol %, preferably from about 50 to 80 mol %, of the isocyanate groups of the starting polyisocyanate (a) are in a blocked form and from about 10 to 30 mol %, preferably from about 10 to 20 mol %, of the isocyanate groups of the starting polyisocyanate (a) are present in a form which has reacted with the hydrazine adduct.

The starting polyisocyanate (a) may be reacted with the hydrazine adduct (b) and the blocking agent (c) successively or simultaneously, when blocking is effected initially and modification with the hydrazine adduct (b) is carried out thereafter, care must naturally be taken that not all of the isocyanate groups of the starting polyisocyanate (a) are blocked by the blocking agent (c). According to a particularly preferred embodiment of the present process, the starting polyisocyanate (a) is reacted simultaneously with the hydrazine adduct (b) and the blocking agent (c), using a solution of the hydrazine adduct in the blocking agent. This reaction is particularly preferably carried out such that the starting polyisocyanate (a) is initially partly blocked with some of the blocking agent and the partly blocked polyisocyanate is then reacted with a solution of the hydrazine adduct in the remainder of the blocking agent. The present process may be carried out in the absence of solvents or in the presence of suitable inert solvents, for example, ethylene glycol monoethyl ether acetate, butyl acetate, methyl-ethyl or methyl-isobutyl ketone, toluene or xylene. The reaction according to the present invention is generally carried out with heating and within the temperature ranges specified until a homogeneous melt or solution is produced. Auxiliary solvents which are optionally used and excess blocking agent which may be present are then removed, for example, by distillation. If the products are to be used in solvent-containing two-component polyurethane lacquers, then removal of the solvent may naturally be omitted provided, of course, that during the production of the present lacquer polyisocyanates, solvents or solvent mixtures are used which are also suitable for the use in solvent-containing lacquers containing the present lacquer polyisocyanates.

The present lacquer polyisocyanates which may be obtained in this manner impart to the lacquers produced therewith an increased color stability to heat. The simple and economic practicability of the present process must be emphasized as a particular advantage thereof. Since the hydrazine adducts (b) which are essential according to the present invention are preferably difunctional for the purposes of the isocyanate-addition reaction, the NCO functionality of the starting polyisocyanate is unchanged by the incorporation of the hydrazine adducts (b), in contrast to the process according to German Offenlegungsschrift No. 1,720,711.

The present lacquer polyisocyanates are suitable as isocyanate component for thermosetting two-component polyurethane lacquers, both as a cross-linker in powder lacquers and as a cross-linker for solvent-containing stoving lacquers.

For this use according to the present invention of the present lacquer polyisocyanates, hydroxyl group-containing reactants known from polyurethane chemistry are particularly to be included as reactants. For example, these are polyesters or copolymers containing hydroxyl groups described, for example, for powder lacquers in German Offenlegungsschrift No. 2,842,641, but also polyethers or polycarbonates containing hydroxyl groups described, for example, for solvent-containing stoving lacquers in German Offenlegungsschrift No. 2,550,156.

For the production of the powder lacquers which are ready for use, a resin containing hydroxyl groups and the polyisocyanate cross-linker according to the present invention are mixed and are optionally provided with pigments, flowing agents, catalysts, for example, tin compounds and other conventional additives which are mixed in the melt into a homogeneous material in extruders at temperatures of from about 100° to 120° C. The resins containing hydroxyl groups and the products of the present process are used in such quantities that a total of from about 0.6 to 1.2, preferably from about 0.8 to 1.0, of total NCO groups (both free and blocked) are provided per hydroxyl group.

The solidified material is ground and is adjusted to the required grain size of approximately 0.1 mm by sieving. The resulting powder lacquers may be applied to molded parts to be coated according to the conventional powder application processes, for example, by electrostatic powder spraying. The coatings are hardened by heating to temperatures of from about 150° to 220° C., preferably from about 170° to 190° C. Hard, glossy and elastic coatings are obtained which have excellent anticorrosive characteristics and an improved color stability to heat.

For the production of ready-for-use, solvent-containing stoving lacquers, the solutions of the present lacquer polyisocyanates are mixed with solutions of the resins containing hydroxyl groups and are provided, when required, with catalysts, pigments and flowing agents. Suitable solvents, for example, toluene, xylene, butyl acetate, EGA (ethylene glycol monoethyl ether acetate), methyl ethyl ketone, methyl isobutyl ketone or N-methyl pyrrolidone, are present in quantities of from about 30 to 60%, by weight, based on the ready-for-use lacquer.

The lacquers may be applied by spraying or by roll coating. The coated parts may be stoved at from about 120° to 250° C., depending on the blocking agent used and on the residence time provided in the furnace. Stoving lacquers of this type are used, for example, in tube lacquering or for coil-coating sheets. The lacquer films exhibit good mechanical characteristics in addition to a desirable weather resistance.

In the following Examples, all the percentages relate to percent, by weight, unless otherwise indicated.

EXAMPLES

EXAMPLE 1

This Example describes the production of a lacquer polyisocyanate according to the present invention, based on diethylene glycol-modified diisocyanato-toluene, the further processing thereof into a powder lacquer, the characteristics of this lacquer and, in particular, the overstoving strength thereof.

(A) Production of the hydrazine adduct 50 parts, by weight, of ε-caprolactam are melted and mixed with 3.75 parts, by weight, of hydrazine hydrate at 70° C. 8.40 parts, by weight, of 2-oxo-4-methyl-1,3-dioxolane (propylene glycol carbonate) are added to this melt and the mixture is heated with stirring to 100° C. (mol ratio of hydrazine:carbonate=1:1.1). After the reaction has proceeded for approximately 20 minutes, a water jet vacuum is applied and approximately 1.35 parts, by weight, of water are distilled off at an internal temperature of 100° C. 60.8 parts, by weight, of a colorless melt of the hydrazine adduct in ε-caprolactam remain.

(B) Production of the lacquer polyisocyanate 174 parts, by weight, of diisocyanato-toluene (80% 2,4-/20% 2,6-isomers) are introduced into a vessel provided with a bottom outlet valve and are reacted, with stirring, with 39.75 parts, by weight, of diethylene glycol at from 80° to 100° C., until the calculated NCO content of 24.6% is attained. A portion of ε-caprolactam, 71.5 parts, by weight, is then introduced portionwise at from 120° to 130° C. The blocking reaction takes place exothermically. Accordingly, the end of the reaction is noted by the fall in temperature. 60.8 parts, by weight, of the colorless melt of the hydrazine adduct in ε-caprolactam, described under (A) are then added at from 130° to 140° C. Thereafter, the mixture is again stirred for 20 minutes at approximately 140° C. and the resin melt is then poured onto sheets.

Based on the weight of the hydrazine-modified lacquer polyisocyanate to be obtained, excluding the weight of the ε-caprolactam used as blocking agent, out of a total of 20.6% NCO, the lacquer polyisocyanate has 0.47% of free isocyanate groups, 20.13% of blocked isocyanate groups (calculated as NCO) and 2.48% of structural units corresponding to the following formula:

—NH—NH—CO—O—

86 mol % (or 21.16%) of the NCO groups of the starting isocyanate (NCO content 24.6%) were blocked, 12 mol % (or 2.95%) were reacted with the hydrazine adduct and 2 mol % (or 0.49%) remained free.

(C) Production of the lacquer

For a powder lacquer, 46.2 parts, by weight, of a polyester containing hydroxyl groups, based on terephthalic acid, neopentyl glycol, hexane diol-1,6 and trimethylolpropane having an OH number of 50, 13.3 parts, by weight, of the lacquer polyisocyanate described under (B), 39.9 parts, by weight, of a commercially-available titanium pigment (rutile R-KB 4 of Bayer AG, Germany) and 0.6 parts, by weight, of a commercially available flowing agent based on acrylate (Acronal ®4 F of BASF AG, Germany) are melted and homogenized in an extruder at 120° C. The dosage of the binder components corresponds to the equivalent weights. In the calculation which is relevant here, the lacquer polyisocyanate was based on 13% of blocked and free NCO groups, relating to the weight including the blocking agent. The extruded product is ground; the grain fraction of from 0.02 to 0.1 mm is applied to test sheets using an electrostatic spraying device and is hardened in a stoving furnace at 180° C. for 15 minutes. The lacquer has the following mechanical characteristics:

| | |
|---|---|
| Erichsen drawing test (DIN 53156) | 10 mm |
| Conical mandrel flexing test (ASTM D 522-60) | 35% extensibility |
| Grind section (DIN 53151) | 0 |
| Impact elasticity (in accordance with ASTM G-14) | 140 cm × kg |

The stoving or overstoving strength with respect to yellowing is shown from the following series of comparative tests:

| Stoving Conditions | 15 min. at 180° C. | 15 min. at 200° C. | 30 min. at 200° C. | 10 min. at 220° C. | 20 min. at 220° C. |
|---|---|---|---|---|---|
| whiteness according to A. Berger (1) (Reflectometer value according to DIN 67530) (2) | 81 | 78 | 74.7 | 77.8 | 71.5 |
| | 78 | 73 | 67 | 68 | 61.7 |

[in Elrepho-units]
In above and in the following tables the first figures refer to the stoving times and temperatures whereas the subsequent figures refer to the over-stoving times and temperatures of the coatings previously stoved.

The second row of tests indicates the clearly lower whiteness values of an analogous lacquer which only differs from the lacquer according to the present invention in that the hydrazine adduct is missing.

EXAMPLE 2

The production of a lacquer polyisocyanate according to the present invention based on 4,4'-diisocyanato-diphenyl methane and the yellowing resistance of a powder lacquer produced therewith upon stoving are described.

(A) Production of the hydrazine adduct 5 parts, by weight, of hydrazine hydrate are mixed with approximately 10 parts, by weight, of toluene/isopropanol (1/1). 11.2 parts, by weight, of 2-oxo-4-methyl-1,3-dioxolane (propylene glycol carbonate) are added with stirring at room temperature (mol ratio of hydrazine:carbonate=1:1.1). The reaction takes place exothermically, so that the temperature of the reaction mixture rises to approximately 80° C. A short time thereafter the solvent, together with the water, is distilled off initially at normal pressure and then using a water jet vacuum, the sump temperature not being raised above 100° C. 14.4 parts, by weight, of hydrazine adduct remain in the form of a colorless melt which tends to crystallize.

(B) Production of the lacquer polyisocyanate 250 parts, by weight, of distilled 4,4'-diisocyanato-diphenyl methane are introduced into a reactor fitted with a bottom outlet valve, as explained in Example 1, and are reacted with 120 parts, by weight, of ε-caprolactam at from 110° to 130° C. 28.8 parts, by weight, of the melt described under (A) are then introduced. The reaction temperature should not exceed 150° C. After the exothermic reaction subsides, the residual quantity of 60 parts, by weight, of ε-caprolactam is stirred in at approximately 145° C.

Based on the weight excluding the weight of the blocking agent, the thus-obtained lacquer polyisocyanate has a content of free NCO groups of 0%, a content of blocked NCO groups (calculated as NCO) of 24% and a content of structural units corresponding to the following formula:

—NH—NH—CO—O— of 5.3%. 80 mol % (or 26.9%) of the NCO groups of the starting isocyanate (NCO content 33.6%) are blocked and 20 mol % (or 6.7%) are reacted with hydrazine adduct.

(C) Production of the lacquer

For the production of a powder lacquer, 47.3 parts, by weight, of the hydroxyl polyester described in Example 1, 12.2 parts, by weight, of the lacquer polyisocyanate described above, 39.9 parts, by weight, of the above commercially-available titanium pigment (rutile) and 0.6 parts, by weight, of the above commercially-available flowing agent based on acrylate are processed into a powder lacquer, as described in Example 1. The dosage of the binder components corresponds in this case to the ratio of the equivalent weights thereof, an NCO content of 14.5% being taken as a basis for the lacquer polyisocyanate, based on the weight including the blocking agent. The following data indicates the whiteness values which decrease when the temperature increases.

| Stoving Conditions | | 15 min. at 180° C. | 30 min. at 200° C. | 20 min. at 220° C. |
|---|---|---|---|---|
| whiteness according to A. Berger (Reflectometer value according to | (1) | 80.0 | 66.3 | 56.9 |
| DIN 67530) | (2) | 63.2 | 48.1 | 39.6 |

[in Elrepho-units]

Compared to the lacquer described above having the cross-linker according to the present invention, an analogous lacquer was produced having a cross-linker without the small portion of hydrazine adduct. The greater yellowing of this lacquer is revealed in the lower whiteness values of the second row compared to the values of the lacquer of the first row, stabilized with hydrazine adduct.

EXAMPLE 3

The production of a lacquer polyisocyanate according to the present invention, based on 4,4'-diisocyanato-dicyclohexyl methane and the yellowing resistance of a powder lacquer produced therewith are described.

(A) Production of the hydrazine adduct 57 parts, by weight of ε-caprolactam, 7.5 parts, by weight, of hydrazine hydrate and 20.4 parts, by weight, of 2-oxo-4-methyl-1,3-dioxolane (propylene glycol carbonate) are reacted and dehydrated at from 80° to 100° C. as in Example 1 (mol ratio of hydrazine:carbonate=1:1.33). 82.2 parts, by weight, of a colorless melt remain.

(B) Production of the lacquer polyisocyanate 131 parts, by weight, of 4,4'-diisocyanato-dicyclohexyl methane are mixed with the melt produced according to (A) with stirring, at approximately 110° C. The reaction temperature should not exceed 145° C. After the addition is completed, the mixture is again stirred for a short time at from 145° to 150° C. and is applied to sheets.

Based on the weight, excluding the weight of the blocking agent, the thus-obtained lacquer polyisocyanate has a content of free isocyanate groups of 5.3%, a content of blocked isocyanate groups (calculated as NCO) of 13.4% and a content of structural units corresponding to the following formula:

—NH—NH—CO—O— of 7.1%. 50 mol % (or 16.0%) of the NCO groups of the starting isocyanate (NCO content 32.0%) are blocked, 30 mol % (or 9.6%) are reacted with hydrazine adduct and 20 mol % (or 6.4%) remain free.

(C) Production of the lacquer 45 parts, by weight, of the hydroxyl polyester described in Example 1, 14.5 parts, by weight, of the above-mentioned cross-linker, 39.9 parts, by weight, of the above commercially-available titanium pigment (rutile) and 0.6 parts, by weight, of the above commercially-available flowing agent based on acrylate are processed into a powder lacquer according to Example 1. During this procedure, the binder components are metered in the ratio of the equivalent weights thereof. In the calculation of the NCO cross-linking equivalent, a total NCO content of the lacquer polyisocyanate, based on the weight, including the blocking agent, of 11.7% was taken as a basis. The following data shows the stability of this lacquer to yellowing (first row) in comparison to an analogous lacquer, but without the incorporation of the relevant hydrazine adduct (second row) from the whiteness values:

| Stoving Conditions | | 15 min. at 200° C. | 30 min. at 200° C. | 20 min. at 220° C. |
|---|---|---|---|---|
| whiteness according to A. Berger (Reflectometer value according | (1) | 86.6 | 83.1 | 80.0 |
| to DIN 67530) | (2) | 78.4 | 74.0 | 63.4 |

[in Elrepho-units]

EXAMPLE 4

The production of a lacquer polyisocyanate according to the present invention based on a cyclopolymerized hexamethylene diisocyanate containing isocyanurate groups and the yellowing resistance of a powder lacquer produced therewith are described.

(A) Production of the hydrazine adduct 0.5 parts, by weight, of hydrazine hydrate are reacted with 0.98 parts, by weight, of 2-oxo-1,3-dioxolane (ethylene glycol carbonate) and processed according to Example 2(A) (mol ratio of hydrazine:carbonate=1:1.11). 1.3 parts, by weight, of a colorless, crystallizing hydrazine adduct remain.

(B) Production of the lacquer polyisocyanate 19.6 parts, by weight, of trimerized hexamethylene diisocyanate having an NCO content of 21.4%, by weight, are reacted in analogous manner to the previous Examples, initially with 7.9 parts, by weight, of ε-caprolactam and then with 1.7 parts, by weight, of 4,4'-bis-(2-hydroxyethoxy)-diphenyl sulfone at from 100° to 130° C. (The last-mentioned diol component is only used for increasing the melting point of the cross-linker and may be replaced by ε-caprolactam when used as a solution). When the exothermic reaction has subsided, 1.3 parts, by weight, of the hydrazine adduct produced under (A) are metered in such that the temperature is maintained at from 130° to 135° C. The resin melt which has finished reacting is applied to sheets and is crushed.

Based on the weight, excluding the weight of the ε-caprolactam used, the thus-obtained lacquer polyisocyanate has a content of free NCO groups of 0%, a content of ε-caprolactam-blocked NCO groups (calculated as NCO) of 13% and a content of structural units corresponding to the following formula:

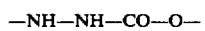

—NH—NH—CO—O— of 3.28%. Of the 100 mol % of NCO groups of the diol-modified HDI trimer (calculated NCO content: 17.8%), 77.5 mol % (or 13.8%) are blocked and 22.5 mol % (or 4.0%) are reacted with hydrazine adduct.

(C) Production and yellowing characteristics of the lacquer 42.0 parts, by weight, of the hydroxyl polyester described in Examples 1 to 3, 17.5 parts, by weight, of the lacquer polyisocyanate described above (having a content of blocked NCO groups of 9%, by weight, including the weight of the blocking agent), 39.9 parts, by weight, of the above titanium pigment (rutile) and 0.6 parts, by weight, of the above flowing agent based on acrylate are processed into a powder lacquer as described in Examples 1 to 3 and are stoved and overstoved in the following manner:

| Stoving Conditions | 15 min. at 200° C. | 30 min. at 200° C. | 20 min. at 220° C. |
|---|---|---|---|
| whiteness according to A. Berger (1) | 83.7 | 78.2 | 74.0 |
| (Reflectometer value according to DIN 67530) (2) | 80.7 | 75.3 | 58.6 |

[in Elrepho-units]

A deterioration occurs in the whiteness when the temperature increases. The second row of tests indicates the more rapidly decreasing whiteness of an analogous lacquer, the difference being that the cross-linker instead of the hydrazine adduct only contains another quantity of ε-caprolactam which is equivalent to the hydrazine adduct.

EXAMPLE 5

The production of a polyisocyanate cross-linker according to the present invention based on partially trimerized isophorone diisocyanate and the yellowing resistance of a stoving lacquer applied from solution and produced therewith are described.

(A) Hydrazine reaction product

The adduct is used according to Example 2 from 1 mol of hydrazine and 1.1 mols of propylene glycol carbonate.

(B) Production of the lacquer polyisocyanate 153 parts, by weight, of an isophorone diisocyanate trimerized to an NCO content of 27.5%, by weight, are mixed with 157 parts, by weight, of ethylene glycol-monoethyl ester acetate. 61 parts, by weight, of butanone oxime are added and after the exothermic reaction has subsided, 21.6 parts, by weight, of the hydrazine reaction product according to Example 2 are added. The mixture is then reacted at 100° C. until an NCO content may no longer be detected.

Based on the weight, excluding the weight of the blocking agent and of the solvent, the thus-obtained lacquer polyisocyanate has a content of free isocyanate groups of 0%, a content of blocked isocyanate groups (calculated as NCO) of 16.8% and a content of structural units corresponding to the following formula:

—NH—NH—CO—O— of 6.35%. 70 mol % (or 19.3%) of the NCO groups of the starting isocyanate (NCO content: 27.5%) were blocked and 30 mol % (or 8.2%) were reacted with hydrazine adduct.

(C) Production and yellowing characteristics of the lacquer 23.6 parts, by weight, of a hydroxyl polyester based on isophthalic acid, phthalic acid, hexane diol-1,6 and trimethylol-propane having an OH number of 165 and an OH equivalent weight of 360 are dissolved in 15.8 parts, by weight, of ethylene glycol-monoethyl ether acetate and are ground with 28.1 parts, by weight, of the above titanium dioxide pigment (rutile) and 0.5 parts, by weight of a commercially-available silicone fluid (Baysilon ® OF OH 502 of Bayer AG, Germany). 32.0 parts, by weight, of the above-mentioned lacquer polyisocyanate are added to this pigment suspension. The binder components containing OH and NCO groups are metered during this procedure in a mol ratio of 1.15:1.0, corresponding to an under-cross-linking, the cross-linker solution based on a content of blocked NCO groups of 7.5%, by weight, including the weight of the blocking agent.

The lacquer composition is sprayed onto test sheets, stoved and overstoved under the following conditions:

| Stoving Conditions | 30 min. at 150° C. | 15 min. at 200° C. | 15 min. at 220° C. |
|---|---|---|---|
| whiteness according to A. Berger (1) (Reflectometer value according to DIN 67530) (2) | 85.9 83.5 | 84.8 81.6 | 83.2 79.6 |

The second row of tests indicates the greater decrease in the whiteness with an analogous lacquer which has not, however, been modified with hydrazine adduct.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A lacquer polyisocyanate, characterized by a content, based on the weight of said polyisocyanate, but excluding the weight of the blocking agent, of:
   (a) free isocyanate groups of from about 0 to 8%, by weight;
   (b) isocyanate groups blocked with blocking agents of from about 10 to 28%, by weight;
   (c) structural units corresponding to the following formula:

—NH—NH—CO—O— of from about 2 to 10%, by weight.

2. A process for the production of a lacquer polyisocyanate according to claim 1, characterized in that
   (a) from about 10 to 30 mol % of the isocyanate groups of an organic polyisocyanate are reacted with reaction products which have
      (i) alcoholic hydroxyl groups and
      (ii) structural units corresponding to the following formula:

—O—CO—NH—NH—CO—O— and/or the following formula:

H₂N—NH—CO—O— said reaction products being obtained from 1 mol of hydrazine or hydrazine hydrate and about 1 to 2 mols of cyclic carbonate, the reaction (a) taking place with the formation of urethane groups and optionally groups corresponding to the formula:

—NH—NH—CO—O— and
   (b) from about 50 to 90 mol % of the isocyanate groups of the starting isocyanate are blocked with blocking agents; the reaction (a) being carried out before, during or after the reaction (b).

3. The process according to claim 2, characterized in that, in step (a), reaction products of hydrazine or hydrazine hydrate with ethylene or propylene carbonate are used.

4. The process according to claim 2 or 3, characterized in that polyisocyanates or polyisocyanate mixtures having an average NCO content of from about 14 to 50%, by weight, and selected from the group consisting of hexamethylene diisocyanate, 1-isocyanato-3,3,5-trimethyl-5-isocyanatomethyl-cyclohexane, 4,4'-diisocyanato-dicyclohexyl methane, 2,4- and/or 2,6-diisocyanato-toluene, 2,4'- and/or 4,4'-diisocyanatodiphenyl methane, urethane group-containing reaction products of these diisocyanates with less than stoichiometric quantities of aliphatic diols or triols having a molecular weight of from about 62 to 400 and the trimers or mixed trimers of these diisocyanates having isocyanate and isocyanurate groups are used as the organic polyisocyanate.

5. In the process of preparing a composition based on polyhydroxyl compounds and at least partially blocked polyisocyanates, the improvement which comprises mixing the polyisocyanate of claim 1 with said polyhydroxyl compounds.

* * * * *